(12) United States Patent
Pant et al.

(10) Patent No.: US 6,581,412 B2
(45) Date of Patent: Jun. 24, 2003

(54) GAS DELIVERY AT HIGH FLOW RATES

(75) Inventors: Atul Pant, Williamsville, NY (US); Melvyn Richardson, San Antonio, TX (US); Mike Leshner, Columbia, MD (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 10/217,672

(22) Filed: Aug. 13, 2002

(65) Prior Publication Data

US 2003/0046941 A1 Mar. 13, 2003

Related U.S. Application Data

(63) Continuation of application No. 09/755,590, filed on Jan. 5, 2001, now abandoned.

(51) Int. Cl.[7] ................................................. F25J 1/00
(52) U.S. Cl. ................................... 62/657; 62/50.2
(58) Field of Search ................................. 62/50.2, 657

(56) References Cited

U.S. PATENT DOCUMENTS

| | | | | |
|---|---|---|---|---|
| 3,245,248 A | * | 4/1966 | Ritter | 62/48.1 |
| 3,628,347 A | * | 12/1971 | Puckett et al. | 62/48.1 |
| 3,690,115 A | * | 9/1972 | Clayton | 62/48.1 |
| 3,888,089 A | * | 6/1975 | Cooper | 62/48.1 |
| 4,116,016 A | * | 9/1978 | Roop et al. | 62/50.2 |
| 4,608,831 A | * | 9/1986 | Gustafson | 62/48.1 |
| 5,376,213 A | * | 12/1994 | Ueda et al. | 118/724 |
| 5,761,911 A | * | 6/1998 | Jurcik et al. | 62/50.2 |

* cited by examiner

Primary Examiner—Ronald Capossela
(74) Attorney, Agent, or Firm—Robert J. Follett

(57) ABSTRACT

This invention is directed to a method for delivering a liquefied compressed gas with a high rate of flow comprising passing a liquefied compressed high-purity semiconductor gas into a storage vessel; positioning a temperature measuring means onto the wall of the compressed gas storage vessel; positioning at least one heating means proximate to the storage vessel; monitoring the resulting temperature with the temperature measuring means; positioning a pressure measuring means at the outlet of the storage vessel and monitoring the vessel pressure; adjusting the heat output of the heating means to heat the liquefied compressed gas in the storage vessel to control the evaporation of the liquefied compressed gas in the storage vessel; and controlling the flow of the gas from the storage vessel.

41 Claims, 7 Drawing Sheets

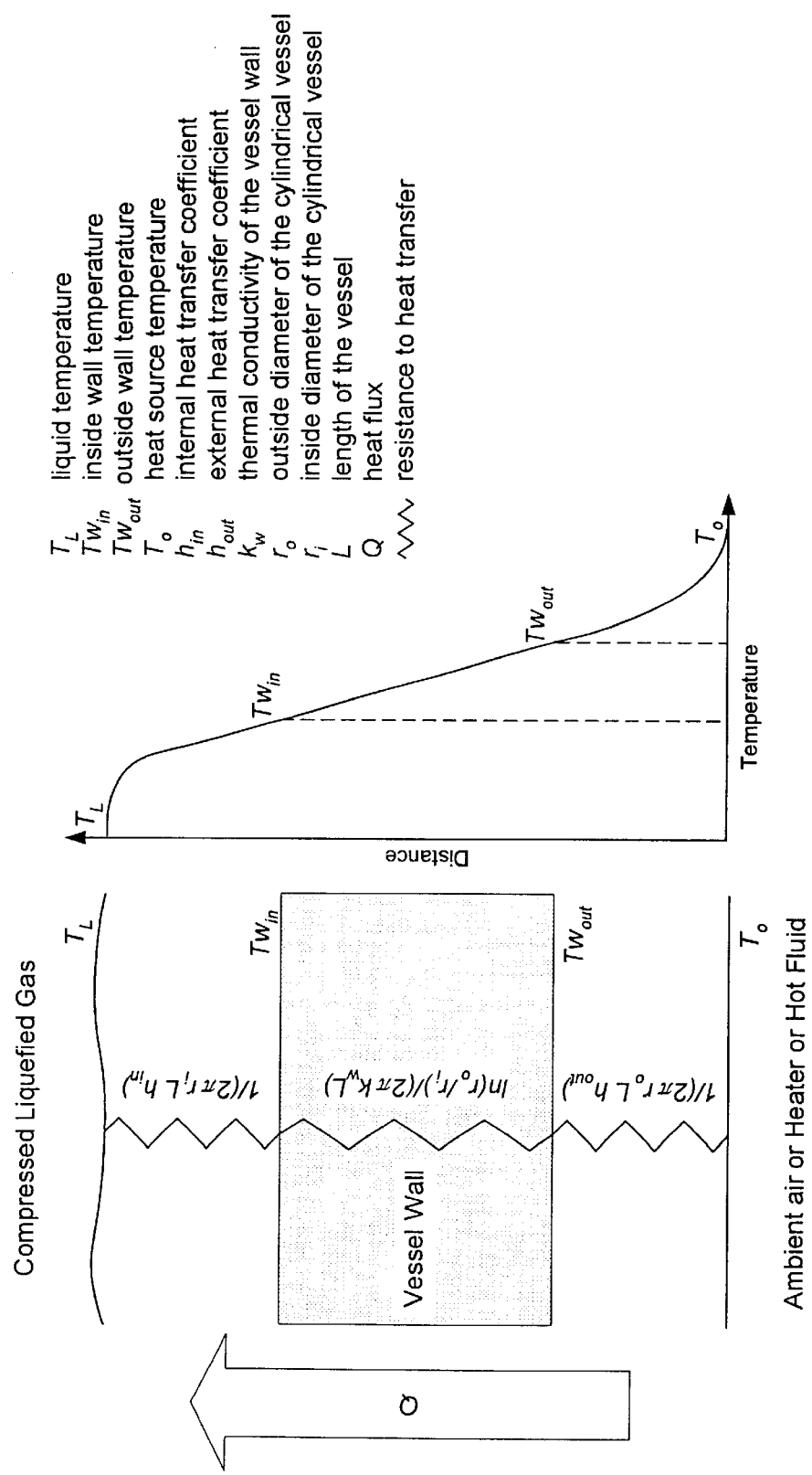
Figure 1: Schematic Representation of Heat Transfer Across Vessel Walls

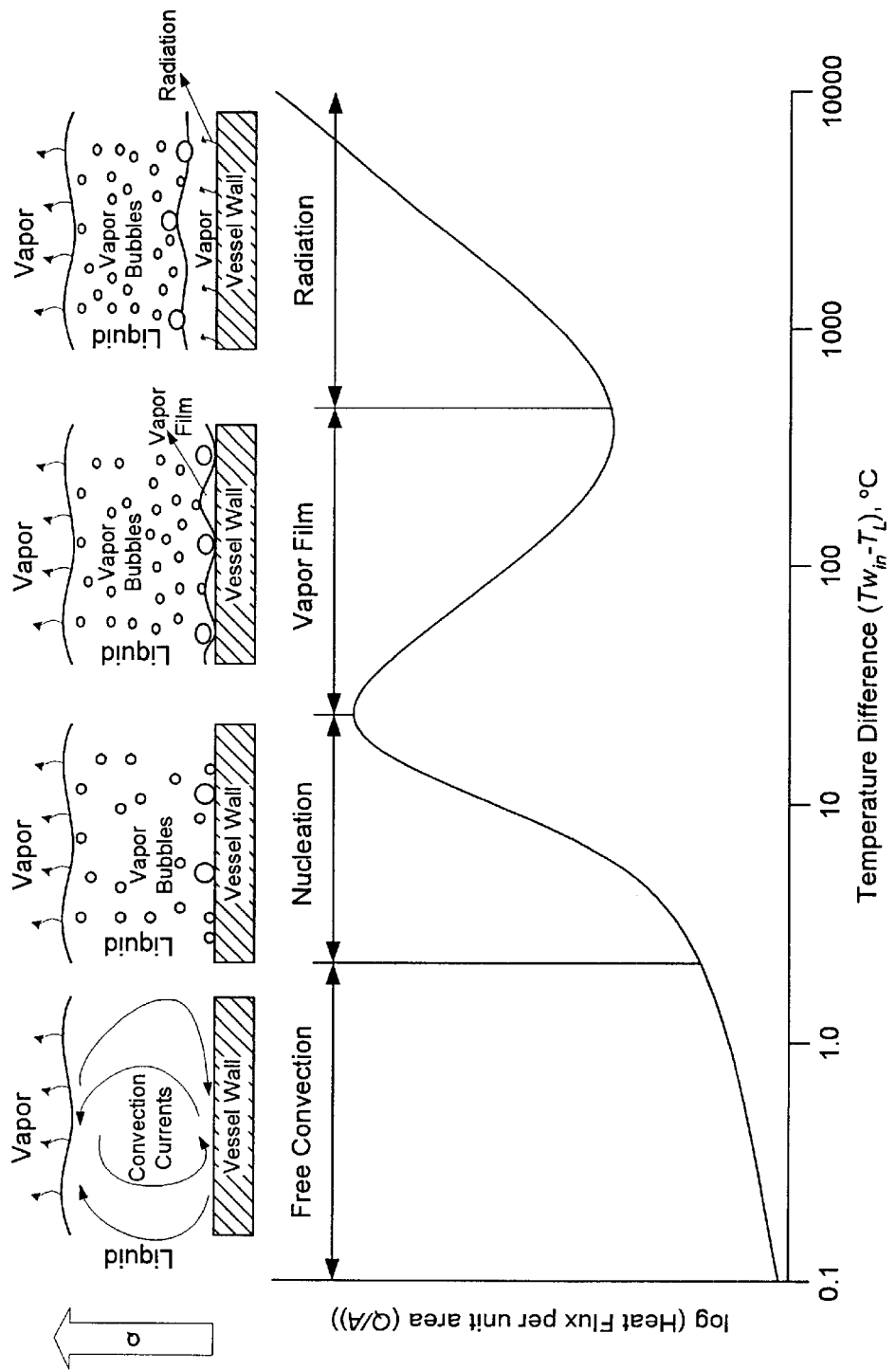
Figure 2: Typical Boiling Curve for a Liquid (not necessarily for ammonia)
(Schematics on the top represent the characteristics of each boiling regime.)

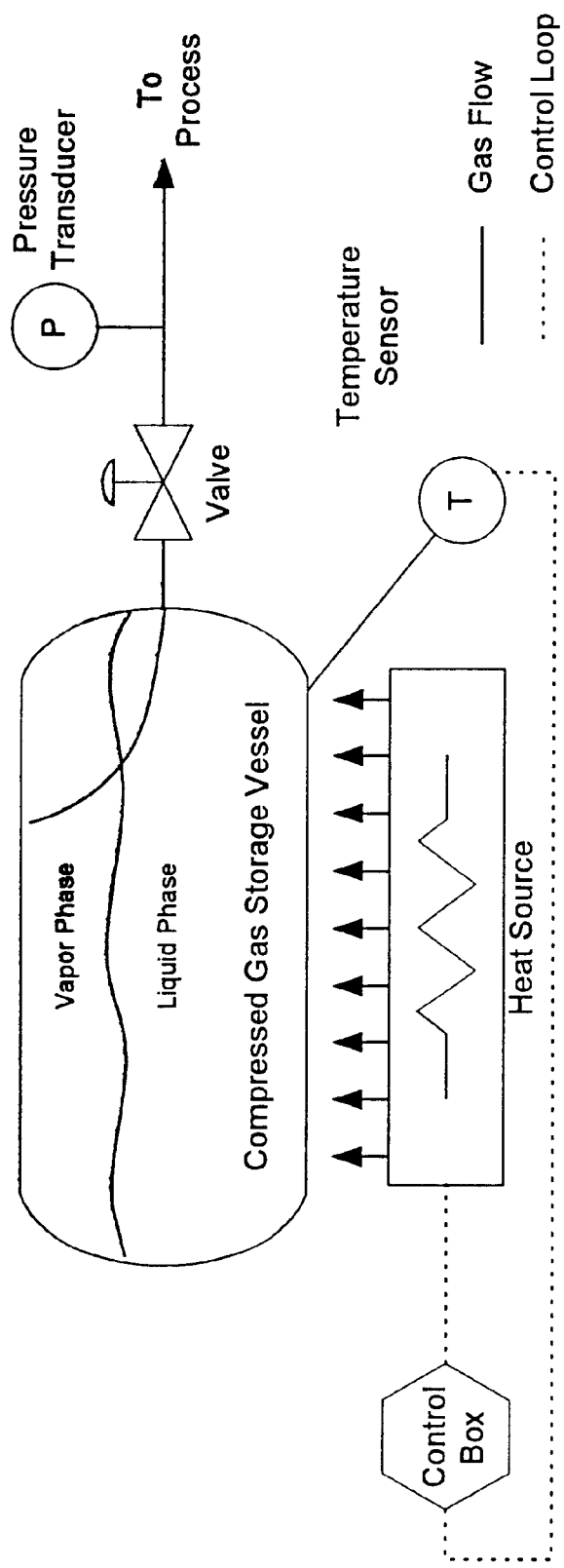
Figure 3: Experimental Setup to Deliver High Vapor Flowrates

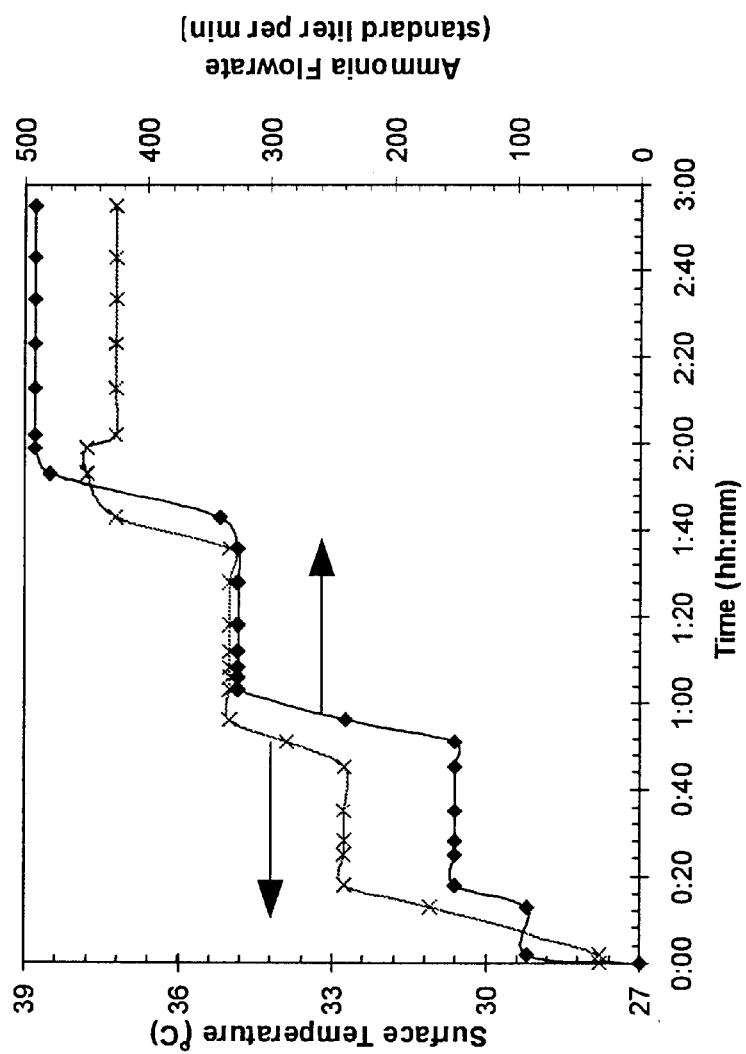
Figure 4: Variation of Ammonia Flowrate and Surface Temperature with Time

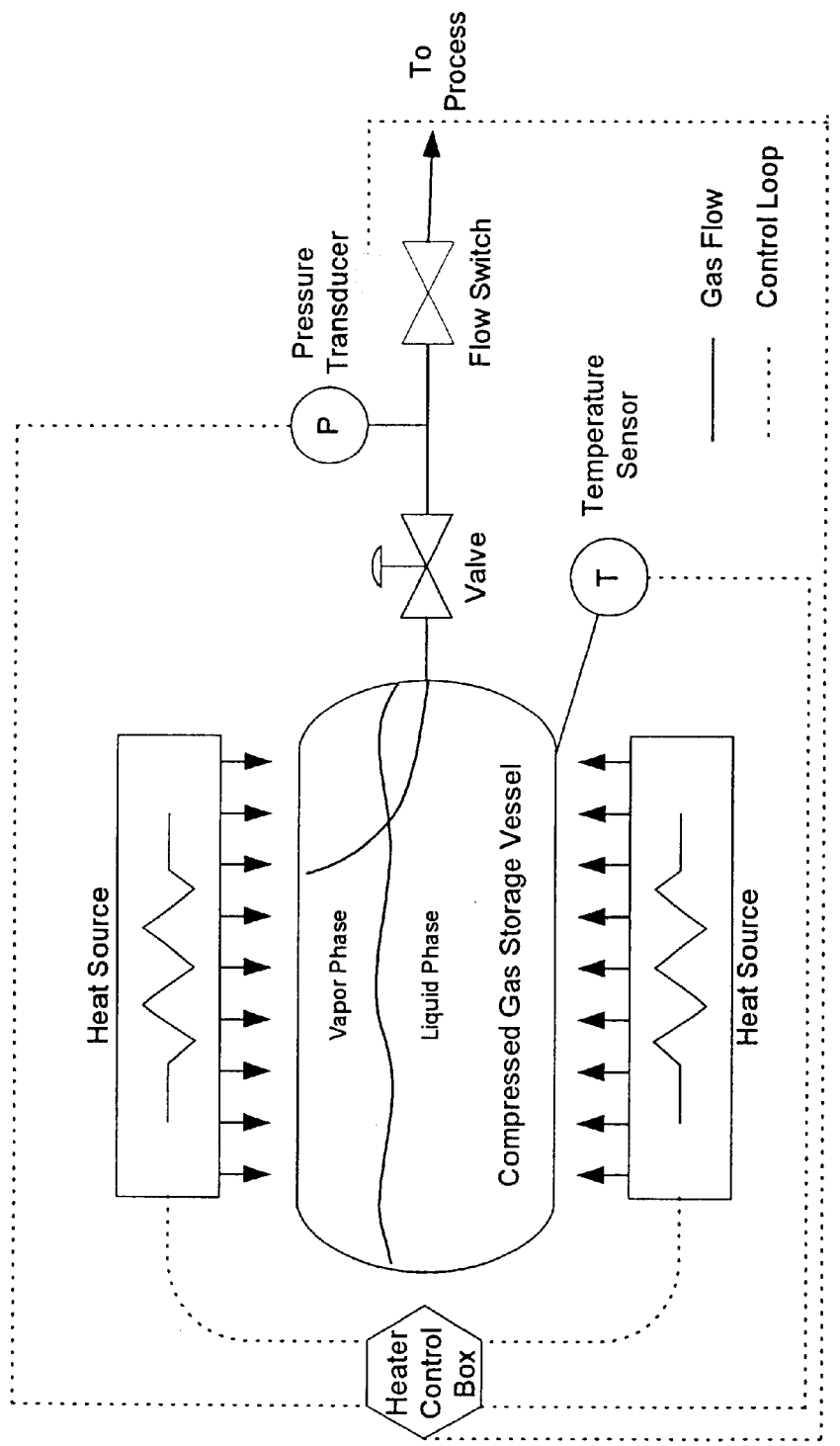
Figure 5: Schematic of the Proposed Delivery System

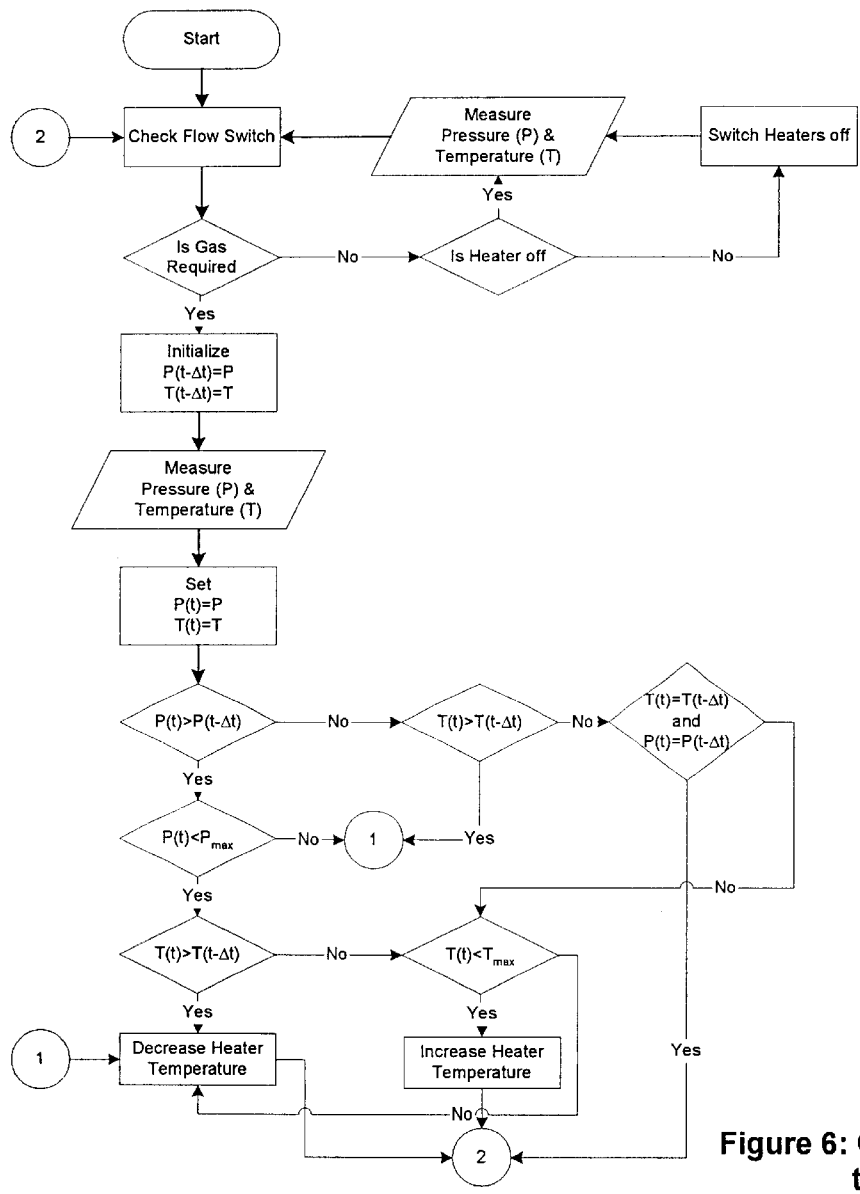
Figure 6: Control Strategy for the Delivery System

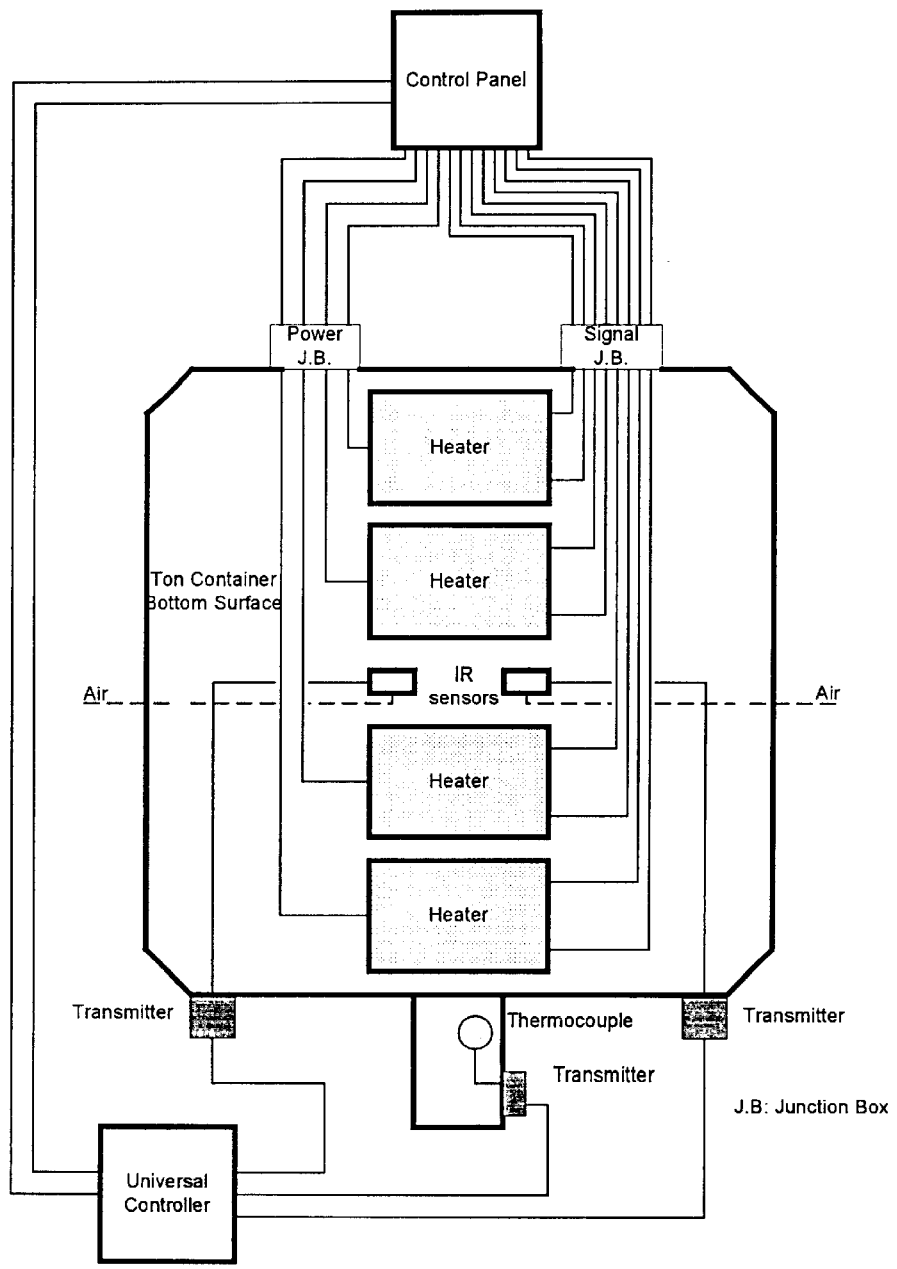
Figure 7: Schematic of the Protoype Ammonia Delivery System

GAS DELIVERY AT HIGH FLOW RATES

This application is a continuation of prior U.S. application Ser. No. 09/755,590 filed Jan. 5, 2001, now abandoned.

FIELD OF THE INVENTION

This invention is related to the delivery of gases at high flow rates, and more specifically, this invention is related to a method and system for delivering high purity semiconductor gases at high flow rates.

BACKGROUND OF THE INVENTION

There is a growing need in semiconductor manufacturing to deliver specialty gases to the point of use at high flow rates. Conventional compressed gas storage vessels (i.e., cylinders and ton containers) have liquefied gas under its own vapor pressure at ambient temperature. As the vapor is withdrawn from the vessel, the liquid evaporates at an equivalent rate to account for the decrease in pressure. This consumes energy from the remaining liquid in the tank. In the absence of heat transfer to the vessel, the liquid temperature drops, leading to a corresponding drop in the vapor pressure. Further vapor withdrawal eventually subcools the liquid and the flow of vapor reduced.

Along with liquid subcooling, rapid vapor withdrawal and uncontrolled heat transfer to the storage vessel also induces violent boiling at the vessel walls. This results in carryover of metastable liquid droplets into the vapor phase. In addition, the conventional sources of compressed gas storage deliver saturated vapor. A decrease in its temperature or a flow restriction in the process line leads to condensation. The presence of liquid droplets in the vapor stream is detrimental to most instruments and therefore needs to be minimized.

The problem, therefore, was to deliver high vapor flowrates from conventional sources, with minimal liquid carryover and without liquid subcooling.

The prior art has disclosed some ways of delivering high vapor flow rates from conventional sources, but none of the prior art teaches or suggest a method and system for such delivery at high flow rates using an external source with optimal heat transfer from the storage vessel walls to the liquid as well as minimizing the liquid droplet formation n the process lines.

U.S. Pat. No. 6,122,931 discloses a system that transports liquefied gas from a storage vessel to a distillation column and uses the distillate to deliver ultra-high purity vapor to the point of use. Additional processing steps are involved using liquefied gas.

U.S. Pat. No. 6,076,359 discloses increasing the heat transfer between the ambient and the gas cylinder placed in a gas cabinet. The increase is achieved by altering air flow rate in the cabinet and adding fins internal to the cabinet. This enhances the heat transfer from the ambient to the cylinder. The resulting flow rate is comparatively low. However, the increase in delivery flowrate is still not significant enough to meet the current demands.

U.S. Pat. No. 5,894,742 discloses a liquefied compressed gas pumped into evaporators, which convert the liquid into vapor phase before delivering the gas to the point of use. Using a number of such evaporators, each corresponding to a use point allows for high throughput through the delivery system.

U.S. Pat. No. 5,673,562 discloses the use of a storage vessel fitted with an internal heat exchanger, which maintains the temperature of the liquid-gas interface. The heat is transferred to the interface either by radiation or conduction through the gas phase.

U.S. Pat. No. 5,644,921 discloses superheating the vapor withdrawn from a storage vessel containing liquefied compressed gas heated using an external heat exchanger. This superheated vapor is then used to exchange heat with the liquid phase by passing the vapor through heating tubes immersed in the liquid phase. This cools the vapor and induces liquid boiling to maintain a minimum vapor pressure in the vessel. The cooled vapor is then delivered to the point of use.

All the methods presented in the patents discussed above provide means of supplying additional energy to the liquid through external sources. However, these methods are not adaptable to existing sources of compressed gas storage and require additional equipment. This makes those inventions capital intensive. Further, these inventions only address the issue of supplying additional energy to the system. There is no teaching or suggestion on methods of decreasing the various heat transfer resistances, which allows for optimal operation of the delivery system.

Udischas R. et al., "Performance and Cost Comparison for Various Bulk Electronic Specialty Gas Delivery Solutions", presented in Workshop on Gas Distribution Systems, SEMICON West 2000 compared the economic advantage of various delivery systems for compressed gases. The maximum delivery flow rate used for the comparison was 400 standard liters per min (slpm) ammonia flowing for two hours and 1000 slpm HCl flowing for one hour.

Yucelen B. et al., "High Flow Delivery Systems for Bulk Specialty Gases", presented in Workshop on Gas Distribution Systems, SEMICON West 2000 disclosed that externally heating the ton containers can deliver high flow rates (up to 1500 slpm). The focus of the paper is to analyze the moisture carryover in the vapor at high flow rates.

In view of the prior art, there is a need for a method and system which 1) facilitates the withdrawal of vapors from the existing sources of compressed gas storage (cylinders and ton containers) at high flow rates using an external heat source; 2) proposes a control strategy which allows for optimal heat transfer from the storage vessel walls to the liquid, and 3) develops a method to deliver high vapor flow rates while minimizing liquid droplet formation in the process lines.

SUMMARY OF THE INVENTION

One aspect of this invention is directed to a method for controlling the temperature of a liquefied compressed gas in a storage vessel comprising passing a liquefied compressed gas into a storage vessel; positioning a temperature measuring means onto the wall of the compressed gas storage vessel; positioning at least one heating means proximate to the storage vessel; monitoring the temperature of the compressed gas within the storage vessel with the temperature measuring means; and adjusting the output of the heating means to heat the liquefied compressed gas in the storage vessel.

In another embodiment, this invention is directed to a method for maintaining the evaporation of a liquefied compressed gas in a storage vessel during vapor delivery comprising passing a liquefied compressed high-purity semiconductor gas into a storage vessel; positioning a temperature measuring means onto the wall of the storage vessel; positioning at least one heating means proximate to the storage vessel; monitoring the temperature of the compressed gas within the storage vessel with the temperature measuring means; positioning a pressure measuring means at an outlet of the storage vessel; monitoring the pressure of the compressed gas within the storage vessel with the pressure measuring means; passing a portion of a gas out of the storage vessel; and adjusting the heat output of the heating means to maintain a desired pressure.

In yet another embodiment, this invention is directed to a method for delivering a liquefied compressed gas with a high rate of flow comprising passing a liquefied compressed high-purity semiconductor gas into a storage vessel; positioning a temperature measuring means onto the wall of the compressed gas storage vessel; positioning at least one heating means proximate to the storage vessel; monitoring the resulting temperature with the temperature measuring means; positioning a pressure measuring means at the outlet of the storage vessel and monitoring the vessel pressure; adjusting the heat output of the heating means to heat the liquefied compressed gas in the storage vessel to control the evaporation of the liquefied compressed gas in the storage vessel; and controlling the flow of the gas from the storage vessel.

In yet another embodiment, this invention is directed to a method for delivering ammonia with a high rate of flow comprising passing a high-purity liquefied compressed ammonia gas into a ton container; positioning a thermocouple onto the wall of the ton container; positioning at least one heating means proximate to the ton container; monitoring the thermocouple; positioning a pressure transducer at the outlet of the ton container and monitoring the vessel pressure; monitoring the average weight loss of the liquefied compressed ammonia in the ton container; adjusting the temperature from the output of the heating means to heat the liquefied ammonia in the ton container; boiling the liquefied compressed ammonia under convective and nucleate boiling regimes; controlling the evaporation of the liquefied compressed ammonia in the ton container under the convective and nucleate boiling regimes; and controlling the flow of ammonia from the ton container.

This invention is also directed to a system for delivering a semiconductor process gas with a high rate of flow comprising a storage vessel containing a liquefied compressed semiconductor process gas; a temperature measuring means positioned onto the wall of the storage vessel; a pressure probe positioned at the outlet of the storage vessel; a heating means positioned proximate to the storage vessel, wherein the temperature probe and pressure probe is used to adjust the output of the heater to heat the liquefied compressed semiconductor gas in the compressed gas storage vessel and enabling the high flow of semiconductor gas from the compressed gas storage vessel; and a valve means to control the flow of the semiconductor gas flowing from the storage vessel.

The storage vessel is a cylinder or a ton container. The liquefied may be ammonia, hydrogen chloride, and hydrogen bromine, chlorine or perfluoropropane. Generally, the temperature measuring means is a thermocouple. The heating means is a ceramic heater, a heating jacket or a hot fluid heat transfer device.

As used herein, the term high flow rates means the speed at which the gas flows from the storage vessel in this invention. For the purpose of this invention, the term high flow rates refers to that of greater than or about 500 slpm.

As used herein, storage vessel means any the container holding the liquefied gas in this invention. For purposes of this invention, the storage vessels are cylinders or ton containers. Other types of storage vessels capable of storing liquefied gases are also contemplated herein.

As used herein, proximate refers to a position indicating an immediate vicinity. In at least one embodiment, proximate refers to the position of the heating means as being close to the vessel.

DETAILED DESCRIPTION OF THE DRAWINGS

Other objects, features and advantages will occur to those skilled in the art from the following description of preferred embodiments and the accompanying drawings, in which:

FIG. 1 provides a schematic representation of heat transfer across the vessel walls in this invention;

FIG. 2 provides a typical boiling curve for a liquid;

FIG. 3 provides a schematics of the experimental setup for delivering high vapor flow rates in this invention;

FIG. 4 provides a schematics for the variation of ammonia flow rate and surface temperature with time;

FIG. 5 provides a schematics for delivery systems;

FIG. 6 provides a flow diagram for the delivery system; and

FIG. 7 is a schematics of the prototye ammonia delivery system.

DETAILED DESCRIPTION OF THE INVENTION

This invention allows for optimal heat transfer to the liquefied gas in a storage vessel by confining the liquid boiling in free convection and nucleate boiling regime. The invention provides transfer heat flux of up to about 180 $kWm^{-2}$ to deliver up to about 1000 slpm of ammonia while maintaining the liquid close to ambient temperature. One embodiment has shown the transfer heat flux to be about 93.5 $kWm^{-2}$ delivering about 500 slpm of ammonia. Similar transfer heat fluxes and flow rates are applicable for other similar semiconductor gases and determined by the characteristics of those gases.

The present invention can deliver high vapor flow rates at relatively low surface temperature, where the surface temperature is expected to be not more than 20° C. above the bulk liquid or the ambient temperature. The delivery of high vapor flow rates at relatively low heater temperature can be conducted by enhancing heat transfer from the heater to the vessel.

The present invention allows the use of all the available surface area for heat transfer by an external heat source, such as the use of a hot fluid bath, to the liquid phase. A control strategy allows achieving and maintaining high vapor flow rates at low surface temperatures, as well as enhancing heat transfer to the liquid. Further the system and methods of this invention have the potential of reducing liquid droplets in the vapor phase without any additional instrumentation by superheating the vapor phase in the vessel. A means for reducing both the external and internal resistance to heat transfer is also provided.

In the proposed system, a heat source external to the system is used to supply energy to evaporate the liquid. The heat source could be either a heating jacket or, a hot fluid in direct contact with the vessel. In the case of a hot fluid (like water or oil), submerging the vessel in the fluid bath offers the lowest resistance to heat transfer (see Table 1). In the case of a heating jacket, the heaters are designed for higher temperature to compensate for a poor contact between the heaters and the vessel. This allows sufficient energy to be transferred to the liquid even if the effectiveness of the heater-vessel contact deteriorates with time. Frequent changes of the compressed gas vessel, which is inevitable at high flow rates, may reduce the contact effectiveness. In addition, it is difficult to exactly duplicate the contact after every cylinder change. Using a conductive grease or rubber between the heating jacket and the vessel further reduces the external contact resistance.

A control strategy is proposed to minimize the internal resistance to heat transfer at the vessel-liquid contact. The strategy confines the liquid evaporation in the convective and nucleate boiling regime. This objective is achieved by monitoring the temperature of the vessel surface in contact with the liquid and the pressure of the vessel. A decrease in the surface temperature indicates that the heat flux from the heat source to the vessel is less than the energy required for liquid vaporization at a given flow rate. This indicates a high external heat transfer resistance. Increasing the temperature of the heat source (hot fluid or heating jacket) increases the heat flux in such a scenario. An increase in the surface temperature with decreasing pressure indicates that the heat flux from the vessel to the liquid is less than the energy required for liquid vaporization. This indicates the onset of vapor film boiling, which increases the internal resistance to heat transfer. Reducing the heater temperature enhances the heat flux in this scenario.

The same heating source is also used to transfer heat to the vapor phase, thus resulting in delivery of superheated vapor. This minimizes the number of liquid droplet in the gas phase and reduces the use of elaborate instrumentation to prevent vapor condensation in process lines. The superheated vapor provides the energy required to evaporate liquid droplets present in the vapor phase. The superheated vapor also compensates for cooling across flow restrictions minimizing vapor condensation.

This invention does not require the use of novel storage vessels, and can deliver a large range of vapor flow rates from the conventional compressed gas storage vessels thus reducing capital investment and meeting customer needs. The strategy proposed in the invention controls the liquid evaporation in the convective and nucleate boiling regime thus increasing the heat transfer rates. The increased heat flux at a given temperature leads to an optimal method for high flow rate delivery.

The basis of this invention relates to the energy balance around the liquid in a compressed gas container, delivering vapor at a flow rate F, as represented by equation (1).

$$mCp_L \frac{dT_L}{dt} = Q - F\Delta H_{vap}(P_{sat}) \quad (1)$$

The required energy for vaporization, $F\Delta H_{vap}(P_{sat})$, either comes as sensible heat loss (drop in liquid temperature, $T_L$) or heat transfer (Q) from a heat source. $\Delta H_{vap}(P_{sat})$ is the latent heat of vaporization at saturation pressure, $P_{sat}$. The symbol m represents the mass of liquid and $CP_L$ is its heat capacity.

To maintain a constant liquid temperature ($dT_L/dt=0$), the heat transfer to the liquid must equal the energy required for vaporization at a given flow rate. The heat transfer source could either be an external heater or the ambient. The rate of heat transfer from a heat source depends on the available surface area (A), overall heat transfer coefficient (U) and the temperature difference between the source and the liquid ($T_o-T_L$), as shown in equation (2).

$$Q=UA(T_o-T_L) \quad (2)$$

FIG. 1 schematically represents the resistance to heat transfer from the heat source to the liquid across a cross-section of the vessel walls. In the figure, $T_o$, $Tw_{out}$, $Tw_{in}$ and $T_L$ represent the temperature of the heat source, outside vessel wall, inside vessel wall and the liquid, respectively. The relationship of the overall heat transfer coefficient, U, to the coefficient for heat transfer from the heat source to the vessel, $h_{out}$, thermal conductivity of the vessel walls, $k_w$, and the coefficient for heat transfer from the walls to the liquid, $h_{in}$ is shown below.

$$\frac{1}{UA} = \frac{1}{2\pi r_o L h_{out}} + \frac{1}{2\pi r_i L h_{in}} + \frac{\ln(r_o/r_i)}{2\pi k_w L} \quad (3)$$

Equation (3) assumes a long cylindrical storage vessel of length, L, with an internal radius, $r_i$ and an external radius, $r_o$. The resistance due to the thermal conductivity ($\ln(r_o/r_i)/(2\Delta k_w L)$) is fixed for a given storage vessel. However, the internal ($1/(2\Delta r_i L h_{in})$) and external ($1/(2\Delta r_o L h_{out})$) heat transfer resistance depends on the operating parameters and the heat source. Typical heat transfer resistance values for various conditions (described later) are listed in Table 1 below.

Table 1: Comparison of Resistance to Heat Transfer based on FIG. 1

| Wall Resistance $\frac{\ln(r_o/r_i)}{2\pi k_w L}\left(10^{-4}\frac{K}{W}\right)$ | External Heat Transfer Resistance $\frac{1}{2\pi r_o L h_{out}}\left(10^{-4}\frac{K}{W}\right)$ | | Internal Heat Transfer Resistance $\frac{1}{2\pi r_i L h_{in}}\left(10^{-4}\frac{K}{W}\right)$ | | |
|---|---|---|---|---|---|
| | Ambient Air | Hot Water | Free Convection | Nucleate Boiling | Film Boiling |
| 1 | 1000 | 15 | 7 | 0.7 | 14 |

The listed values are calculated for an alloy steel ton container with 24 in. outside diameter and 0.5 in. wall thickness. The heated length is assumed to be 5 ft. For these calculations, an ambient temperature of 21° C. and hot water temperature of 27° C. is used. For the internal heat transfer resistance, properties of ammonia at ambient temperature are used. The correlation used to calculate the heat transfer coefficients are taken from "Heat and Mass Transfer", Chapter 5, Perry's Chemical Engineers Handbook, $7^{th}$ Ed., McGraw-Hill, 1999.

Table 1 illustrates that still ambient air offers maximum resistance to external heat transfer. Using these values in the above equations, it can be shown that the heat transfer from ambient air is only sufficient to deliver about 7 slpm of ammonia without significant liquid subcooling. This calculation assumes a 10° C. drop in liquid temperature from subcooling. In the absence of external heat sources, the heat transfer from the ambient limits the rate of vaporization of liquid. To obtain high vapor flow rates without liquid subcooling, external heat sources like a heating jacket or hot fluid bath can be used, both of which are known in the art. In addition to this, the heating means in this invention likewise includes other ceramic heaters or other appropriate devices and methods known in the art for providing heat to the vessel. Using hot water bath can significantly reduce external heat transfer resistance as shown in Table 1. In the case of a heating jacket, the resistance to heat transfer will depend on the contact between the jacket and the vessel. The presence of air gaps between the jacket and the vessel will reduce heat transfer since air acts as an insulator. However, a higher heating jacket temperature can compensate for a poor contact between the heater and the vessel. Placing a thermally conductive fluid between the heater and the vessel can also enhance the heat transfer.

As stated above, the overall heat transfer coefficient also depends on the internal resistance to heat transfer. The internal heat transfer coefficient depends on the temperature difference between the wall and the liquid and the boiling characteristics of the liquid. In general, the pool-boiling characteristics can be broadly divided into four regimes as illustrated by a typical boiling curve in FIG. 2. The boiling curve is a log-log plot of the heat flux per unit area (Q/A) against the temperature difference between the wall and the liquid ($Tw_{in}-T_L$). The four regimes are, free convective boiling, nucleate boiling, vapor film boiling, and radiation boiling. The schematics on top of the curve represent the characteristics of each regime. In free convective boiling, the heated liquid next to the hot wall rises due to natural convection currents and evaporates at the vapor-liquid interface. In the nucleate boiling regime, vapor bubbles form on the vessel wall and rise to the liquid-gas interface without condensing in the bulk liquid. As the temperature difference increases, the bubbles coalesce on the wall surface and form a vapor film. This is referred to as film boiling. Although the temperature difference is higher in this regime, the rate of heat transfer is lower compared to nucleate boiling. At still higher temperature difference, the wall temperature increases significantly resulting in radiation heat transfer. In this regime, the heat flux to the liquid again increases with an increase in the temperature difference. However, this regime is of little practical use for heating due to wall temperatures (greater than about 1000° C.) near the melting point of the conventional vessel materials.

Typical values of the heat transfer resistance in different boiling regimes for ammonia are listed in Table 1. High heat transfer rates are obtained in free convection and nucleate boiling regimes at significantly low temperature difference ($Tw_{in}-T_L$) due to low resistance to heat transfer in the liquid phase. In the film-boiling regime, the vapor film acts as an insulator. This reduces the heat flux to the liquid due to a higher heat transfer resistance in the vapor phase. This illustrates that to deliver high vapor flow rates from compressed gas containers, the rate of vaporization must increase by reducing the overall heat transfer resistance. The energy for vaporization can be supplied by using an external heat source. Low resistance to internal heat transfer can be obtained by controlling the liquid boiling in the free convective or nucleate boiling regime.

The vapor delivered from conventional compressed gas sources is saturated since it is in equilibrium with the liquid present inside the container. In the process piping the vapor can cool due to relatively lower temperature of process lines or temperature drop during expansion across a flow restriction. A drop in temperature of the saturated vapor will result in condensation. The presence of liquid droplets may be detrimental to the instrumentation. Supplying energy to the vapor to compensate for any cooling effect can minimize the formation of liquid droplets.

EXAMPLE

Experiments were conducted to evaluate the feasibility of using ton containers to deliver high flow rates of ammonia. The experiments were used to establish a relationship between the vapor flow rate and the surface temperature.

The experimental setup used for testing the ton containers is shown in FIG. 3. A 4130X alloy steel ton container filled with ~530 lbs of ammonia was used for the experiment. Twelve ceramic heaters were used to control the surface temperature of the ton container. The heater is a mesh of ceramic squares, 1"×1" in size, covering a continuous heating filament. Each ceramic mesh is 6"×19.5" in size and is rated for 3.6 kW. These heaters were spaced ~1" apart and tied together in sets of four along the length of the mesh. Three of these sets were placed side by side along the length of the container. A one-inch thick insulation was used on top of the heaters and the whole assembly was clamped to the bottom of the ton container using steel wires. This heating arrangement covered ~25% of the total surface area of the ton container.

The surface temperature was monitored and controlled at six different locations using thermocouples distributed in a zigzag pattern on the heated surface area. The thermocouples were tag-welded to the surface of the ton container to obtain the true surface temperature. Each thermocouple was used to control a set of heaters using a simple on-off controller. This setup allows for maintaining a uniform temperature across the heated surface. The ammonia flow rates were measured based on average weight loss over a 30 to 50 min period.

FIG. 4 shows the variation of the ammonia flow rate (right y-axis) and the surface temperature (left y-axis) with time. An increase in the surface temperature leads to a corresponding increase in the ammonia vapor flow rate delivered by the ton container. The pressure and liquid temperature, which were also monitored during this experiment, remained constant. The increase in heat flux at higher surface temperature leads to higher vaporization rates, which increases the flow rate. A constant pressure and liquid temperature indicate that energy supplied by the heaters was adequate and all the energy was utilized to vaporize ammonia and maintain the flow rate. The observed temperature difference at various flow rates along with the actual heat flux to the liquid is tabulated in Table 2. The heat flux is calculated using the ammonia flow rate and heat of vaporization.

TABLE 2

Experimental Result

| Temperature Difference ($Tw_{out}-T_L$) (° C.) | Average Ammonia Flowrate (F) (slpm) | Average Heat Flux (Q/A) (kW/m$^{-2}$) |
| --- | --- | --- |
| 2.78 | 150 | 28.61 |
| 3.33 | 327 | 62.25 |
| 4.22 | 363 | 70.60 |
| 5.56 | 492 | 93.51 |

The maximum heat flux that can be transferred to liquid ammonia during nucleate boiling is $1.5 \times 10^3$ kWm$^{-2}$. This heat flux corresponds to the point of maximum between the nucleate and vapor film boiling regime on the boiling curve shown in FIG. 2. The maximum heat flux is calculated using a correlation taken from "Heat and Mass Transfer", Chapter 5, Perry's Chemical Engineers Handbook, 7$^{th}$ Ed., McGraw-Hill, 1999. Using the heat transfer correlation for nucleate boiling, it can be further shown that the temperature difference between the vessel wall ($Tw_{in}$) and the bulk liquid ($T_L$) at this point of maximum heat flux is ~20° C. for ammonia. In the experiment, the observed temperature difference between the outside vessel surface ($Tw_{out}$) and the bulk liquid ($T_L$) was less than 6° C. at a flowrate of 492 slpm. This shows that even at such high flowrates the liquid was just at the onset of nucleate boiling. Still higher flowrates can be easily achieved in this regime due to enhanced heat transfer.

Conceptually, using the above experimental configuration 7890 slpm of ammonia can be delivered while still boiling liquid ammonia in the nucleate regime.

The experimental data presented above demonstrates that a range of vapor flow rates can be delivered from ton containers using an adequate heat source and controlling the surface temperature. The data also shows that these high flow rates can be achieved just at the onset of nucleate boiling.

A preferred system is illustrated in FIG. 5. The system consists of the following components: 1) conventional compressed gas source (i.e., gas cylinder, ton container), 2) heat source; 3) valving means (i.e., valves to control the flow of the gas flowing from the gas source; 4) pressure measuring means (i.e., pressure transducer to monitor the pressure in the gas source); 5) temperature measuring means (i.e., temperature sensor to measuring the temperature within the gas source); 6) a heater control box to control the heat; and 7) a flow switch to control the gas flow. In FIG. 5, the solid lines in the figure refer to flow of the gas and the dashed line represents control loops.

The compressed gas storage vessel is filled with liquefied gas under its own vapor pressure at ambient temperature. This results in a liquid phase at the bottom of the container and a vapor phase at the top. The gas to be delivered is withdrawn from the vapor phase by fully opening the valve. In this configuration the pressure transducer reads the vapor pressure inside the vessel. The temperature sensor is used to monitor the surface temperature at the bottom of the vessel, which is always in contact with the liquid phase inside. The temperature is monitored at least, if not more, at three different locations. An average of these readings is used in the control logic. The temperature sensor can be an infrared sensor or a tag-welded thermocouple. The control box can be a computer or a real time logic controller. The heat to the storage vessel is transferred using the heat source.

The heat source can be a jacket heater or a recirculating liquid bath. The temperature of the fluid in the liquid bath is maintained through an external heater and its flow rate is controlled using a flowmeter. The jacket heater can be powered by electricity (like a resistance heater in the experimental setup) or by a recirculating hot fluid. Lowest heat transfer resistance is obtained if the vessel is submerged in a heated liquid bath like water or oil and the fluid is recirculated. If a heating jacket (electric or hot fluid) is used, then it is preferable to use a conductive grease or rubber to increase the contact area between the heater and the vessel.

The control strategy proposed for the delivery system is schematically shown in FIG. 6. The control decisions are based on comparing the value of the pressure, P, and surface temperature, T, at current time, t, to the values at a previous time, t−Δt. This improves the safety of the delivery system by putting an upper bound on the temperature ($T_{max}$) and the pressure ($P_{max}$) and also ensures an uninterrupted delivery. A decrease in the surface temperature with increasing flow rate is a warning of inadequate heating supply. The surface temperature will drop if the heat transferred by the heaters is less than the heat required for vaporizing liquid to maintain a flow rate. An increase in surface temperature with a decreasing pressure indicates boiling in the vapor film regime. In this case the energy transferred from the vessel to the liquid is less than the energy required for vaporization.

Under no flow condition (no process demand for the gas) the valve is left fully open and the pressure and temperature as read by the transducer and the sensor are constant. The process line is filled with the gas. When the customer requires gas a flow switch is opened, which triggers the control loop. The pressure drops as the gas starts to flow and depending on the flow rate, the surface temperature either remains constant or decreases. This triggers the controller to increase the heater temperature to maintain a constant pressure. In case of a recirculating fluid heater (liquid bath or jacketed), either the fluid temperature or fluid flow rate can be effectively used to control the heat supplied to the vessel. The heat supplied by the electric heaters is controlled by the voltage applied to the heaters or by cycling the heaters on and off. The heaters supply energy to the liquid phase leading to liquid vaporization, which maintains a constant pressure in the vessel. Any drop in pressure due to a further increase in the flow rate demand at a constant or decreasing surface temperature increases the power to the heaters to vaporize more liquid. The increased heat input maintains the liquid at a constant temperature.

As the flow rate demand reduces the pressure in the vessel increases due to vapor buildup, it also increases the surface temperature due to heat build up. When both these conditions are satisfied the controller reduces the heater temperature. The heater temperature is also reduced in the following two scenarios. Firstly, if a pressure or temperature upper bound is reached. Secondly, if the surface temperature is increasing while the pressure is decreasing (vapor film boiling). Every time before re-entering the control loop, the flow switch is checked to confirm that the gas is still needed.

Heating the whole vessel also results in heat transfer to the vapor phase in the vessel. This leads to superheated vapor in the container. The excess energy of the superheated vapor helps in the evaporation of any metastable liquid droplets that may have carried over into the vapor phase. Withdrawing superheated vapor from the compressed gas source minimizes the chances of vapor condensation in the process lines, which can be a significant problem when withdrawing saturated vapor. Any drop in temperature or a flow restriction can result in droplet condensation in the lines while using saturated vapor.

Example of Bulk Ammonia Delivery System

The following is a description of a prototype, bulk ammonia delivery system, to be installed at the customer site, which uses a possible variation to control strategy proposed above.

The delivery system consists of a ton container housed in and supported by a sheet metal enclosure. The ton container is a horizontal pressure vessel with an internal volume of ~450 L and weighs ~529 kg. The ton housing has thermal insulation applied internally. The housing is horizontally split at approximately the ton centerline. The top half is hinged to provide access for maintenance, installation and removal of the ton container. The edges are sufficiently rigid to avoid distortion. Three circumferential supports built into the bottom of the housing are equally spaced along the ~52" cylindrical section of the ton. The center support has provision for mounting two infrared detectors, which monitor the ton skin surface temperature. At each end of the housing a sloped guide rail, located on the longitudinal centerline, is incorporated and connected to the end supports to facilitate positioning of the ton container.

To transfer heat to the ton container four ceramic heaters, 12" inside radius ×11"wide×28" cicumferential length are used. The heaters are installed in the housing between the supports in two groups of two. The heater arrangement on the cylindrical section of the ton container is shown in FIG. 7. Each band has a maximum operating temperature of 850° F. and is rated for ~3.75 kW at 440 V, single phase power. Each band is equipped with a mounting flange on each end, suitable for spring attachment. Springs are connected to the inside of the housing such that the heaters exert a clamping force against the vessel when the ton container is lowered into position. This geometry of band/spring/ton surface ensures that at no time do the band heaters carry the weight of the ton container and provides optimal surface contact between the heater and the vessel. This configuration will also allow changing of ton containers without the need for repeated adjustment.

Each heater band is connected to a process controller and is equipped with two thermocouples. One thermocouple is used for control of the temperature set point and the other for over temperature monitoring. The process controllers for the four heaters are mounted in a common control box. The control box applies power to the heaters through the power junction box and reads the temperatures through the signal junction box.

Before the beginning of flow, a pressure set point is entered in the universal controller. The heaters are turned off when the pressure set point is reached and turned back on when pressure falls below the set point. The pressure will fall due to vapor withdrawal. A heater temperature set point is entered into each process controller to put an upper limit to the heater temperature. An over temperature condition sends a signal to the universal controller through the control box, which shuts the heaters off. In addition to the over temperature signal, the heater process controllers will provide a signal to the universal controller in the event of heater burn out or failure, which will initiate an alarm, shut off power to the heaters and initiate an auto switchover to the standby unit.

The two infrared surface temperature sensors are connected to the universal controller and act as the primary safety devices by limiting ton container wall temperature. They have a maximum configurable value of 125° F. Below the configured surface temperature, the sensors allow the heaters to operate. If the surface temperature set point is reached on either sensor, this signal overrides the pressure control process described above. The universal controller shuts off power to the heaters and initiates an automatic switchover to the standby unit. A temperature sensor is also mounted in the process tubing for vapor temperature measurement and the signal is sent to the universal controller. In this invention, the temperature measuring means is any temperature sensor, preferably a thermocouple. The temperature difference between the vapor temperature and the average of the two infrared sensors is compared to a set point configured in the controller.

Temperature difference value greater than the set point is used as a warning of liquid subcooling. This gives the operator the opportunity to reduce ammonia demand or switch to the other ton container.

To summarize the control strategy, the power to heaters is switched on, if all of the following are satisfied: 1) the ton container surface temperature below set point; 2) ton container vapor pressure below set point; 3) no heater over temperature; 4) all heaters operating; 5) ton container surface/vapor temperature differential below set point. If any one of conditions 1), 3) or 4) is not met, power to the heaters is turned off and auto-switchover to the second ton is initiated by the universal controller.

The test of the prototype delivery system established that an average ammonia flow rate of 600 slpm can be maintained for ~2.5 hrs at a delivery pressure of 90 psi without significant liquid sub cooling. The test also established that using the above configuration a maximum ammonia flow rate of 800 slpm can be delivered for 30 mins without significant pressure drop in the ton container.

As used in this invention, the semiconductor gases may be any liquefied compressible gas, and preferably ammonia, hydrogen chloride, hydrogen bromide, chlorine and perfluoropropane.

Although the invention described above operates fully, certain variations are contemplated. Some of the modification may require redesigning the storage vessel.

The storage vessel may be designed as an integral part of the vessel walls. This configuration will offer heat transfer coefficients similar to that obtained when using a hot liquid bath.

The use of internals (like fins) can be added in the storage vessel to increase the heat transfer area. This has the potential to deliver high flow rates at even lower temperatures. The heat transfer will be enhanced, if all the available outer surface of the vessel is heated and highly conductive internal fins extending into the liquid are present, both in the vapor and liquid space.

External fins can also be added to enhance the heat transfer from the fluid bath to the vessel.

A thermocouple or a thermal well may be included in the storage vessel to enable direct liquid temperature measurements. This allows for a more robust control when the liquid temperature, rather than the vessel pressure is maintained constant.

Molecular sieve bed or other separation unit operation, like distillation at the exit may be used to reduce impurities like moisture in the vapor phase, thus, delivering ultra high purity gas to the point of use.

Venting some percentage of the initial vapor headspace to an abatement system will reduce light impurities leading to delivery of ultra high purity gas.

This invention may also be operated in a continuous mode. A liquid evaporator can be designed based on the proposed invention. The existing storage containers can be modified to accept liquid product continuously. Liquefied gas is pumped into this evaporator, where it is continuously vaporized to deliver gaseous product to the point of use. The rate of pumping will depend on the flow rate demand. The flow rate demand and the required vapor temperature will control the heat flux to the evaporator.

Specific features of the invention are shown in one or more of the drawings for convenience only, as each feature may be combined with other features in accordance with the invention. Alternative embodiments will be recognized by those skilled in the art and are intended to be included within the scope of the claims.

What is claimed is:

1. A method for controlling the temperature of a liquefied compressed gas in a storage vessel comprising
    a. passing a liquefied compressed gas into a storage vessel;
    b. positioning a temperature measuring means onto the wall of the compressed gas storage vessel;
    c. positioning at least one heating means proximate to the storage vessel;
    d. monitoring the temperature of the compressed gas within the storage vessel with the temperature measuring means; and
    e. adjusting the output of the heating means to heat the liquefied compressed gas in the storage vessel.

2. The method of claim 1 wherein the storage vessel is a cylinder or a ton container.

3. The method of claim 1 wherein the liquefied compressed gas is a semiconductor process gas selected from the group consisting of ammonia, hydrogen chloride, hydrogen bromine, chlorine and perfluoropropane.

4. The method of claim 1 wherein the temperature measuring means is a thermocouple.

5. The method of claim 1 wherein the heating means is a ceramic heater.

6. The method of claim 1 wherein the heating means is a heating jacket.

7. The method of claim 1 wherein the heating means is a hot fluid heat transfer device.

8. A method for maintaining the evaporation of a liquefied compressed gas in a storage vessel during vapor delivery comprising
   a. passing a liquefied compressed high-purity semiconductor gas into a storage vessel;
   b. positioning a temperature measuring means onto the wall of the storage vessel;
   c. positioning at least one heating means proximate to the storage vessel;
   d. monitoring the temperature of the compressed gas within the storage vessel with the temperature measuring means;
   e. positioning a pressure measuring means at an outlet of the storage vessel;
   f. monitoring the pressure of the compressed gas within the storage vessel with the pressure measuring means;
   g. passing a portion of a gas out of the storage vessel; and
   h. adjusting the heat output of the heating means to maintain a desired pressure.

9. The method of claim 8 wherein the storage vessel is a cylinder or a ton container.

10. The method of claim 8 wherein the liquefied compressed gas is a semiconductor process gas selected from the group consisting of ammonia, hydrogen chloride, hydrogen bromide, chloride and perfluoropropane.

11. The method of claim 8 wherein the temperature measuring means is a thermocouple.

12. The method of claim 8 wherein the heating means is a ceramic heater.

13. The method of claim 8 wherein the heating means is a heating jacket.

14. The method of claim 8 wherein the heating means is a hot fluid heat transfer device.

15. The method of claim 8 wherein the pressure measuring means is a pressure transducer.

16. The method of claim 8 comprising boiling liquefied compressed gas in the storage vessel under convective and nucleate boiling regimes.

17. A method for delivering a liquefied compressed gas with a high rate of flow comprising
   a. passing a liquefied compressed high-purity semiconductor gas into a storage vessel;
   b. positioning a temperature measuring means onto the wall of the compressed gas storage vessel;
   c. positioning at least one heating means proximate to the storage vessel;
   d. monitoring the resulting temperature with the temperature measuring means;
   e. positioning a pressure measuring means at the outlet of the storage vessel and monitoring the vessel pressure;
   f. adjusting the heat output of the heating means to heat the liquefied compressed gas in the storage vessel to control the evaporation of the liquefied compressed gas in the storage vessel; and
   g. controlling the flow of the gas from the storage vessel.

18. The method of claim 17 wherein the storage vessel is a cylinder or a ton container.

19. The method of claim 17 wherein the liquefied compressed gas is a semiconductor process gas selected form the group consisting of ammonia, hydrogen chloride, hydrogen bromide, chorine, and perfluoropropane.

20. The method of claim 17 wherein the temperature measuring means is a thermocouple.

21. The method of claim 17 wherein the heating means is a heating jacket.

22. The method of claim 17 wherein the heating means is a hot fluid transfer device.

23. The method of claim 17 wherein the heating means is a ceramic heater.

24. The method of claim 17 wherein the high rate of flow is up to about 500 slpm.

25. The method of claim 17 comprising measuring the average weight loss of the liquefied compressed gas in the storage vessel.

26. The method of claim 17 comprising boiling the liquefied compressed high-purity semiconductor gas under the convective and nucleate boiling regimes.

27. The method of claim 17 wherein the pressure measuring means is a pressure transducer.

28. A method for delivering ammonia with a high rate of flow comprising
   a. passing a high-purity liquefied compressed ammonia gas into a ton container;
   b. positioning a thermocouple onto the wall of the ton container;
   c. positioning at least one heating means proximate to the ton container;
   d. monitoring the thermocouple;
   e. positioning a pressure transducer at the outlet of the ton container and monitoring the vessel pressure;
   f. monitoring the average weight loss of the liquefied compressed ammonia in the ton container;
   g. adjusting the temperature from the output of the heating means to heat the liquefied ammonia in the ton container;
   h. boiling the liquefied compressed ammonia under convective and nucleate boiling regimes;
   i. controlling the evaporation of the liquefied compressed ammonia in the ton container under the convective and nucleate boiling regimes; and
   j. controlling the flow of ammonia from the ton container.

29. The method of claim 28 wherein the heating means is a heating jacket.

30. The method of claim 28 wherein the heating means is a hot fluid transfer device.

31. The method of claim 28 wherein the heating means is a ceramic heater.

32. The method of claim 28 wherein the high rate of flow is up to about 500 slpm.

33. The method of claim 28 comprising monitoring the average weight loss of the liquefied compressed gas in the ton container.

34. A system for delivering a semiconductor process gas with a high rate of flow comprising
   a. a storage vessel containing a liquefied compressed semiconductor process gas;
   b. a temperature measuring means positioned onto the wall of the storage vessel;
   c. a pressure probe positioned at the outlet of the storage vessel;

d. a heating means positioned proximate to the storage vessel, wherein the temperature probe and pressure probe is used to adjust the output of the heater to heat the liquefied compressed semiconductor gas in the compressed gas storage vessel and enabling the high flow of semiconductor gas from the compressed gas storage vessel; and e. a valve means to control the flow of the semiconductor gas flowing from the storage vessel.

35. The system of claim 34 wherein the storage vessel is a cylinder or ton container.

36. The system of claim 34 wherein the heating means is a heating jacket.

37. The system of claim 34 wherein the heating means is a hot fluid transfer device.

38. The system of claim 34 wherein the heating means is a ceramic heater.

39. The system of claim 34 wherein the high rate of flow is up to about 500 slpm.

40. The system of claim 34 wherein the pressure probe is a pressure transducer.

41. The system of claim 34 wherein the temperature measuring means is a thermocouple.

* * * * *